United States Patent Office 3,398,548
Patented Aug. 27, 1968

3,398,548
VACUUM FREEZE SOLUTION
SEPARATION SYSTEM
Robert Bruce Cox, John H. Davids, and Wallace E. Johnson, Beloit, Wis., assignors to Desalination Plants (Developers of Zarchin Process) Limited, Tel Aviv, Israel, a limited company of Israel
Filed Apr. 20, 1966, Ser. No. 543,907
34 Claims. (Cl. 62—124)

ABSTRACT OF THE DISCLOSURE

The present invention is directed to separation systems, such as desalination systems, employing the vacuum freezing principle and employing the concept of condensing the solvent vapor on the washed frozen solvent to melt the frozen solvent to thereby produce final product with the system apparatus including the evaporating chamber, condensing and melting chamber and wash separator chamber, all being contained within a common housing and in one aspect with a particular arrangement of the wash separator chamber distributing means.

---

This invention relates to methods, systems and apparatus for separating a solvent in substantially pure form from a solution and is more particularly directed to new and improved methods, systems and apparatus for desalting sea water or brackish water to produce potable water.

Heretofore, difficulty has been encountered in the prior art in the design and adaptation of separation systems, for example desalination systems, employing the vacuum freezing, vapor compression principle, for applications involving the production of substantial quantities of potable water on a "per day" basis.

With the present invention these problems and difficulties of the prior art, among others, are substantially overcome by the provision of designs for such systems and apparatus for the production of substantial quantities of potable water per day and which can be utilized for the production of as much as five million gallons of potable water per day.

It is, therefore, an object of the present invention to provide new and improved methods, systems and apparatus for separating a solvent in substantially pure form from a solution.

Another object of the present invention is to provide systems and apparatus for separating a solvent in substantially pure form wherein the system and apparatus are contained in a single main housing.

Still another object of the present invention is to provide freezing systems and apparatus for separating a solvent in substantially pure form from a solution wherein the major components of the system and apparatus are housed in a single vessel and wherein the ice washing and brine removal chamber has a wall common with either the freezing chamber or the vapor condensing and ice melting chamber.

A further object of the present invention is to provide a vacuum freezing, vapor compression desalination system and apparatus wherein the ice washing and brine removal chamber is housed in a common housing with the vacuum freezing chamber and vapor condensing and ice melting chamber and wherein at least two of these chambers have a common wall.

A still further object of the present invention is to provide such systems and apparatus with a modular unit having a particular arrangement of freezing chamber, ice washing and brine removal chamber, compressor, and ice-melting and vapor-condensing chamber which may be combined with similar modular units to provide means for increasing the potable water output of the system or apparatus.

Another object of the present invention is to provide such systems and apparatus wherein a plurality of freezing chambers, compressors, and a plurality of ice-washing and brine-removal chambers may be utilized with a common ice-melting and vapor-condensing chamber in a modular arrangement to provide a range of potable water output capacities for the system or apparatus.

Still another object of the present invention is to provide such systems and apparatus with a simple and effective ice slurry distribution system for the ice-washing and brine-removal chamber.

A further object of the present invention is to provide such systems and apparatus comprising a plurality of modular units including similar freezing chamber and ice-washing and brine-removal chambers which may be clustered about and utilize a common vapor-condensing and ice-melting chamber or which may be arranged in parallel relationship and utilize separate vapor condensing and ice melting chambers.

A still further object of the present invention is to provide vacuum freezing, vapor compressor, desalination systems and apparatus with a modular unit having a particular arrangement of freezing chamber, ice washing and brine removal chamber, compressor, and ice-melting and vapor-condensing chamber which may be combined with similar modular units to provide means for increasing the potable water output of the system or apparatus.

Another object of the present invention is to provide such desalination systems and apparatus wherein a plurality of freezing chambers, compressors, and a plurality of ice-washing and brine-removal chambers may be utilized with a common ice-melting and vapor-condensing chamber in a modular arrangement to provide a range of potable water output capacities for the system or apparatus.

Still another object of the present invention is to provide such desalination systems and apparatus with a simple and effective ice slurry distribution system for the ice-washing and brine-removal chamber.

A further object of the present invention is to provide such desalination systems and apparatus comprising a plurality of modular units including similar freezing chamber and ice-washing and brine-removal chambers which may be clustered about and utilize a common vapor-condensing and ice-melting chamber or which may be arranged in parallel relationship and utilize separate vapor-condensing and ice-melting chambers.

A still further object of the present invention is to provide such systems and apparatus for producing large quantities of potable water which comprise modular units which may employ either radial compressor arrangements or volute compressor arrangements.

These and other objects, features and advantages of the present invention, among others, will become readily apparent from a careful consideration of the following drawings, when read in conjunction with the accompanying description illustrating preferred embodiments of the present invention, wherein like reference numerals refer to like and corresponding parts throughout the several views and wherein:

Although the present invention has a variety of applications, a suitable application thereof is in the treatment of sea water to produce potable water.

Figure 1:
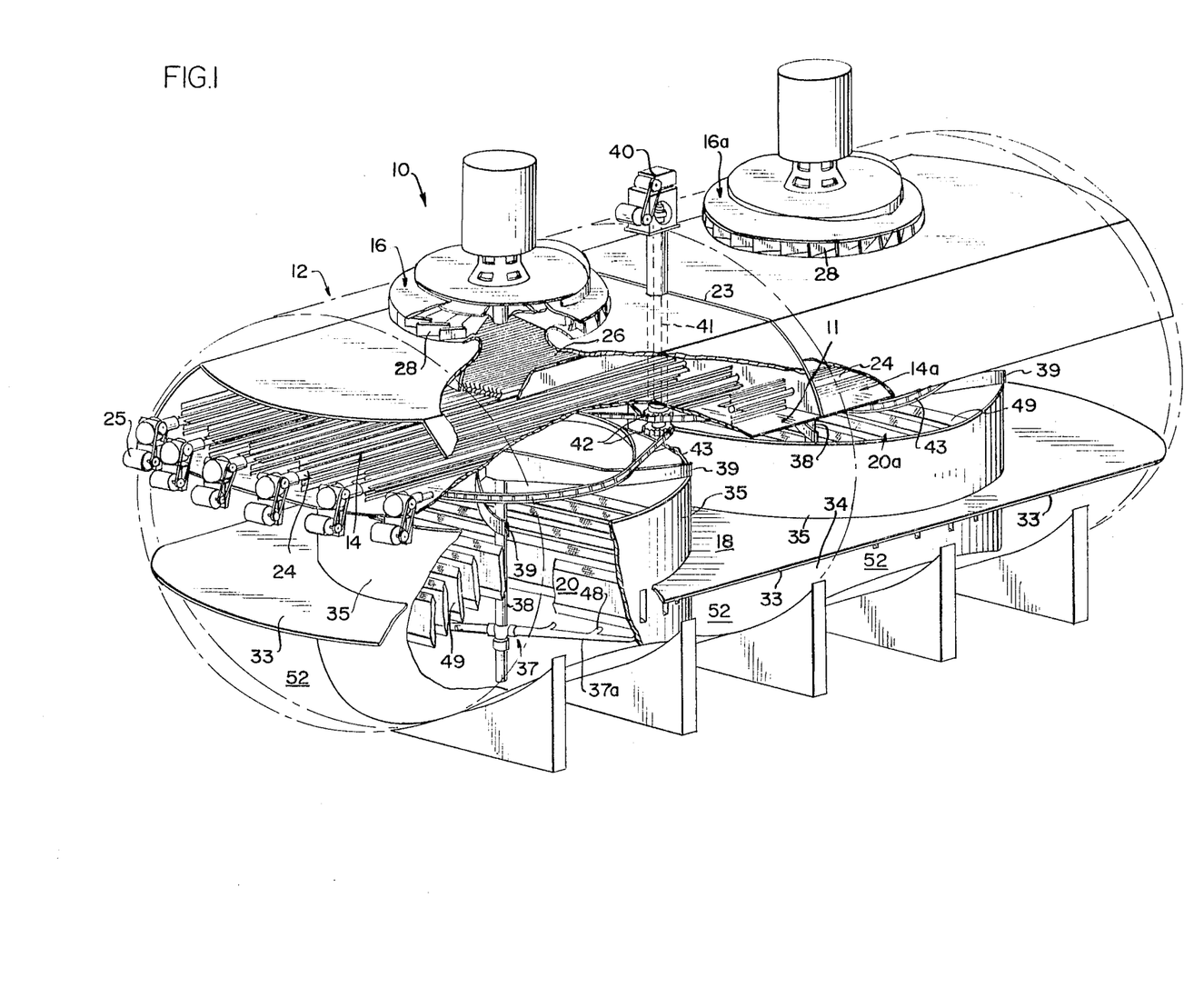
FIGURE 1 is a generally schematic view in perspective and partially broken away to facilitate illustration of a system utilizing the principles of the present invention and employing a radial compressor.
Figure 2:
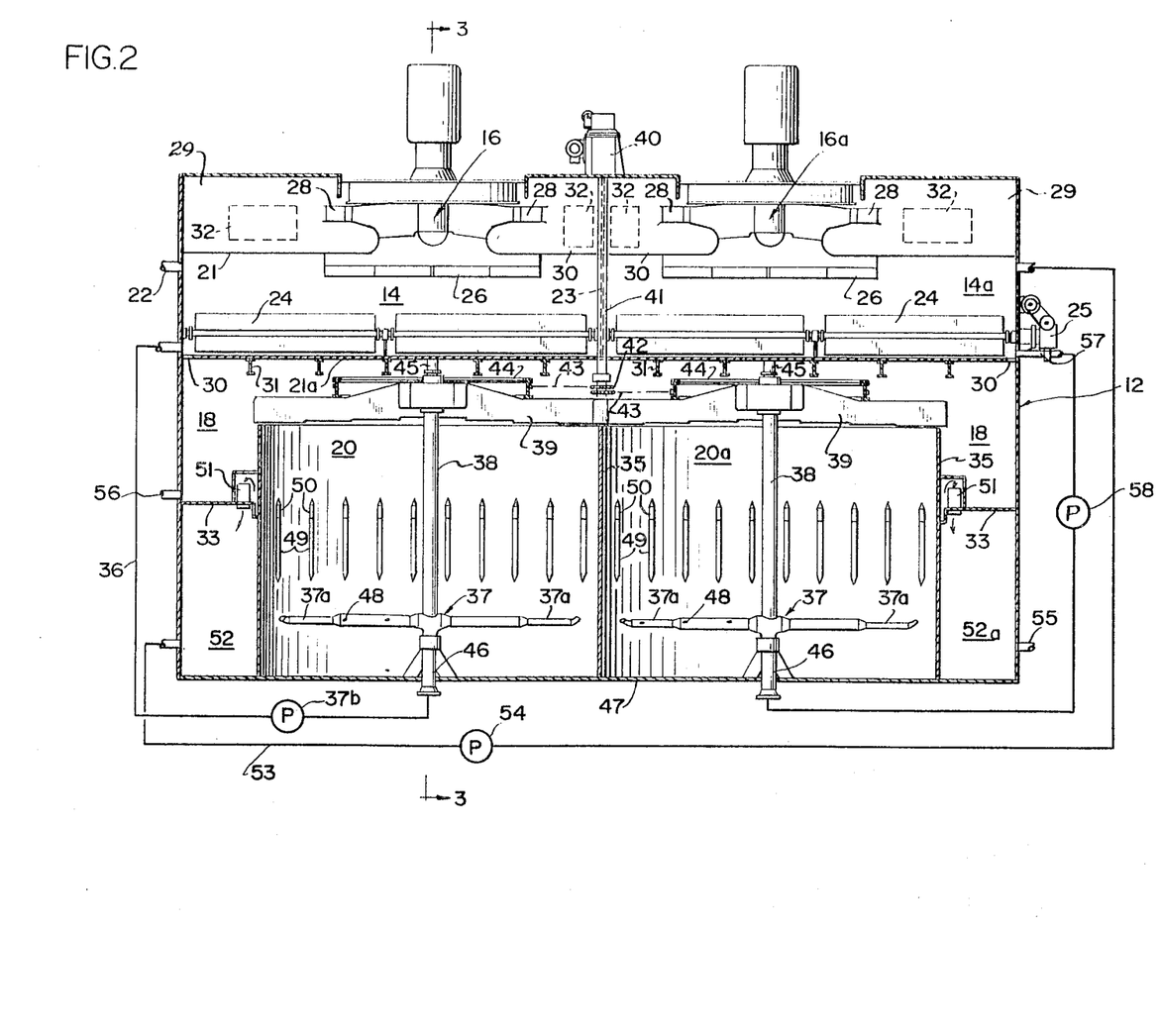
FIGURE 2 is a view in vertical section taken generally along the longitudinal axis of the system of FIGURE 1 illustrating the basic chamber and compressor arrangement of the system of FIGURE 1.
Figure 3:
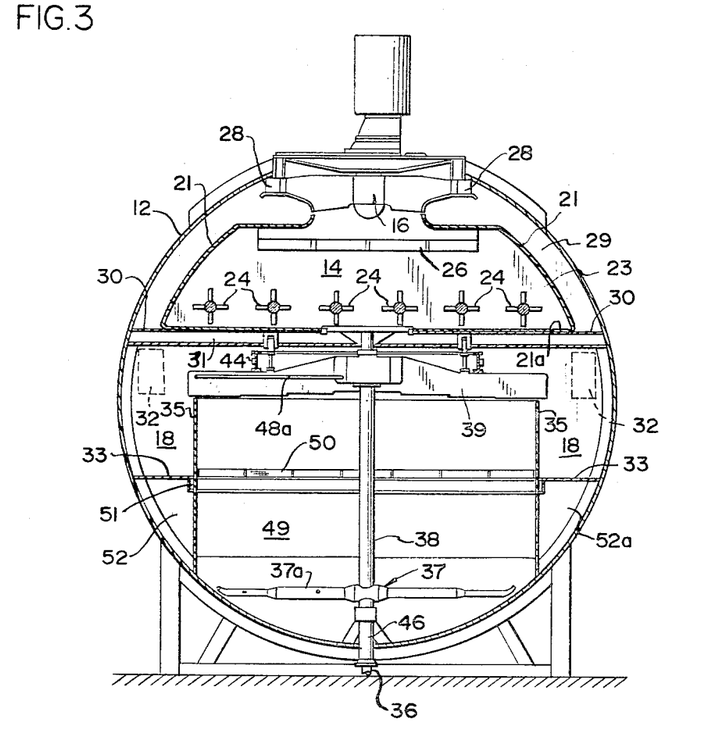
FIGURE 3 is a view in vertical section taken generally along line 3—3 of FIGURE 2.

Referring now to FIGURES 1, 2 and 3 there is shown a system 10 for desalination of sea water employing the vacuum freezing vapor compression principle and with which approximately one million gallons per day of potable water may be produced.

The system 10 is housed in a single vessel 12 which is shown in FIGURE 1 as a horizontal disposed cylinder housing indicated by dotted lines to facilitate illustration and which may have dome-type ends.

Within the single housing 12 is a pair of modular units which may be used independently as separate desalting units or which may be used in parallel for staged treatment of sea water to be clarified. For purposes of description, the units will be discussed as being in a parallel relation for staged treatment of sea water.

Each of the pair of units utilizes the vacuum freezing, vapor compression principle and employs a vacuum freezing chamber, chambers 14 and 14a, a radial compressor arrangement, compressors 16 and 16a, such as the flexibly bladed radial compressor arrangement of copending U.S. application, Ser. No. 195,118, a common ice melting and vapor condensing chamber 18, which for purposes of illustration is shown as a single chamber and an ice washing and brine removal chamber, chambers 20 and 20a, which is operated on the hydraulic piston principle, such as disclosed in copending U.S. application, Ser. No. 433,540.

As appears in FIGURES 2 and 3, the vacuum freezing chamber 14 is defined by an internal housing wall 21 in which is formed an inlet 22 for introduction of sea water into the chamber 14 in a cool condition. The vacuum freezing chamber 14 is separated from the vacuum freezing chamber 14a by a common vertical wall 23 shown in dotted lines in FIGURE 1.

Disposed in the chamber 14 are paddle wheel type agitators 24 which are bearinged at both ends into the walls of the housing 12 for rotation about a horizontal axis. The agitators are provided to change the surface conditions of the pool of ice and sea water formed in the chamber 14 to enhance the ice forming capacity of the chamber 14. The agitator 24 for both chambers 14 and 14a may be driven by a common motor 25 through an appropriate gearing and coupling arrangement (not shown).

The sea water flash evaporates in the vacuum freezing chamber 14 to produce vapor and a pool of a slurry of ice and concentrated sea water. The vapor thus formed flows through a carryover separator 26, such as the louver type carryover separator shown in copending U.S. application, Ser. No. 433,540, under the influence of the radial compressor 16. The carryover separator 26 is provided to minimize the quantity of water droplets entrained in the vapor which flows from chamber 14 into the compressor 16.

The vapor is discharged from the compressor through the outlet 28 of the compressor 16 into a vapor flow chamber 29 which is shown in FIGURE 2 as common to both compressors 16 and 16a.

A heat removal system comprising a plurality of bundles of heat exchange tubes 32 may be disposed in chamber 29 to remove heat from the vapor in order to reduce the heat gain in the system. These heat exchange bundles are well known in the art and, therefore, are illustrated in the drawing in dotted line form.

From the chamber 29, the vapor flows on a continuous basis into the ice melting and vapor condensing chamber 18.

As clearly appears in FIGURE 3, a plurality of spaced braces 30 are employed which extend horizontally to support the evaporating chamber 14 and which permit vapor passage into the chamber 18 through the large size spaces therebetween. The vapor flows past these braces or beams 30 and also past a plurality of spaced beams 31 (FIGURES 2 and 3) which extend transversely to the beams 30 in order to strengthen the assembly.

As appears in FIGURES 2 and 3, the condensing chamber 18 is shown cylindrically and common to both desalting units and the vapor from both compressors 16 and 16a is discharged into this common chamber 18. Chamber 18 is defined on one side by the cylindrical outer housing wall 12, a cylindrical bottom wall 33, and a pair of cylindrical side walls 35 which are common with the ice washing and brine removal chambers 20 and 20a to eliminate the necessity for both separate housings for the chambers 18 and 20 and for separate wall construction for these chambers.

From the vacuum flash freezing chamber 14, the ice and brine slurry is supplied over a line 36 under the influence of a pump 37b to the ice washing and brine removal chamber 20.

The ice washing chamber 20 is of the type utilizing the hydraulic piston effect disclosed and discussed in copending application, Ser. No. 433,540.

A feature of the present invention resides in the utilization of a rotating slurry distributor 37 which comprises a plurality of radial arms 37a apertured as at 48 to distribute, as it rotates, the slurry supplied to the interior thereof over line 36.

The slurry distributor 37 is provided with a vertical drive shaft 38 which may also be the drive shaft for an ice scraper arrangement 39, such as that disclosed in applicant's copending U.S. application, Ser. No. 433,540, and which includes a plurality of spaced radial blades for scraping washed ice from the top of the ice mass or pack located adjacent the top of the chamber 20 into the condensing chamber 18. The shaft 38 is journalled in the bottom 21a of the wall 21 at the top thereof and the conduit portion thereof for the distributor 37 which is connected to the conduit 36 (FIGURE 2) is journalled in the wall 47 as at 46.

In the embodiment shown in FIGURES 1–3, the drive mechanism for the distributors 37 and scrapers 39 in both chambers 20 and 20a, as shown in FIGURE 2, is a common drive and includes a drive motor 40, a main vertical drive shaft 41 which carries a plurality of drive gears 42 for engagement with endless chains 43, which, in turn, engage sprockets 44 carried by the shafts 38 for rotation of the shafts 38. Thus, the main drive shaft 41 causes rotation of the shafts 38 and thus, of the scrapers 39 and distributors 37 in both chambers 20 and 20a.

Also located in the ice-washing and brine removal chambers 20 and 20a are a plurality of spaced substantially rectangularly shaped hollow members 49 having screened members 50 adjacent the tops thereof through which brine is withdrawn from the ice and brine slurry in the chambers 20 and 20a and the brine flows from these devices 49 into a common manifold 51 (FIGURE 2) from which the concentrated brine is supplied into a collection chamber 52.

If staged treatment of sea water is the contemplated use for this system, the brine is moved from chamber 52 over line 53 under the influence of a pump 54 to be supplied to the vacuum freezing chamber 14a of the second desalting unit. The concentrated brine from the collection chamber 52 thus supplied from the ice washing and brine removal chamber 20 to the freezing chamber 14a is treated in substantially the same manner as above described in connection with the first unit by passage of the vapor and ice and concentrated brine through the second unit, e.g., through the vacuum freezing chamber 14a, the compressor 16a, compressor chamber 29, ice melting and vapor condensing chamber 18 and ice-washing and brine-removal chamber 20a. Brine is supplied from chamber 20a to a brine-collection chamber 52a, shown on the right hand side of FIGURE 2, which is separated by wall means (not shown) from the brine collection chamber 52.

If, on the other hand, the desalting units are to be used separately as independent desalting units then the chambers 52 and 52a could be a single chamber (not shown) common to both chambers 20 and 20a and the brine in this single chamber could be supplied to heat exchange means (not shown) over a line 55 to pre-cool sea water being supplied to chamber 14 and/or chamber 14a.

Referring again to staged operation of the two units, the upwardly moving ice mass continuously forming adjacent the top of the chamber 20 is washed with potable water supplied from a source (not shown) to remove brine, and the washed ice is scraped from the top of the ice mass or pack in this chamber 20 by the scraper 39 into the vapor condensing and ice melting chamber 18, as appears in FIGURE 2.

The vapor discharged from the compressor 16 into the chamber 18 will condense on the washed ice and cause the washed ice to melt, thereby producing potable or product water. The product water is discharged from the system over an outlet line 56 and is stored or used for other purposes.

The second unit comprising vacuum freezing chamber 14a, compressor 16a, ice washing and brine removal chamber 20 are similar in construction and operation to the first unit above described and including freezing chamber 14, compressor 16, ice washing and brine removal chamber 20 and therefore the description of the first unit is applicable to the second unit and these chambers and components will not be here described in the same detail. It is noted, however, that both compressors 16 and 16a discharge vapor into a common chamber 29, which communicate with the ice melting and vapor condensing chamber 18 and both ice washing and brine removal chambers 20 and 20a discharge ice into the common chamber 18, in the system shown in FIGURES 1–3.

In operation of the system, therefore, as a staged freezing arrangement of the two units, sea water is continuously introduced over line 22 into the vacuum freezing chamber 14 where the agitator 24 agitates the surface of the pool of sea water and ice in this chamber. A part of the sea water flash evaporates and the vapor thus formed passes through the carryover separator 26 into the compressor 16 and is discharged therefrom through the outlet 28 into the compartment 29 and from the compartment 29 flows into the condensing chamber 18.

Ice-brine slurry in the compartment 14 is supplied over line 36 under the influence of pump 37b into the distribution 37, located in the chamber 20, whereby the sea water is distributed in the ice-washing chamber 20.

Brine is withdrawn from the ice slurry in the chamber 20 through the screens 50 of the rectangular devices 49 which discharge into the manifold 51. The brine is removed from the manifold 51 for supply to the chamber 52.

In staged operation of the system, brine in chamber 52 under the influence of the pump 54 is supplied over line 53 into the vacuum freezing chamber 14a.

The ice in the chamber 20 from which a substantial portion of the brine has been removed is formed into a continuously upwardly moving ice pack or mass which is washed free of still more brine by wash water means (not shown) such as the wash means of FIGURE 1.

The upper surface of the washed ice is scraped by the spaced blades of the rotating scraper 39 into the vapor-condensing and ice-melting chamber 18 wherein ice is melted and the vapor condensed to potable water which is then removed from the system over line 56.

The brine which is supplied to chamber 14a from the chamber 52 is subject to the vacuum conditions in chamber 14a to form vapor and an ice and brine or salt water slurry. The vapor formed in chamber 14a is moved by the compressor 16a through the complementary carry-over separator 26 and is discharged into the chamber 29 (into which, as shown in FIGURE 2, compressor 16 also discharges) through the outlet 28 of compressor 16a and from the chamber 29 into the vapor-condensing and ice-melting chamber 18 (into which, as shown in FIGURE 2, the vapor from compressor 16 is also discharged).

The ice and brine slurry is removed from chamber 14a over a line 57 under the influence of a pump 58 and is supplied to the inlet of the distributor 37 disposed in the ice washing and brine-removal chamber 20a. Brine is removed from the continuously forming ice mass or pack in the chamber 20a through the brine removal devices 49 located in chamber 20a and is discharged into the brine collector 52a for discharge from the system through outlet 55. The ice mass in chamber 20a is washed free of more brine by means (not shown). The washed ice is scraped on a continuous basis from the top of the ice pack by the scraper assembly 39 into the common vapor-condensing and ice-melting chamber 18 wherein the ice melts and the vapor condenses on contact to form potable water. The potable water is then removed from the system over line 56.

As aforesaid, the rotating scraper arrangements 39 in chambers 20 and 20a are both driven from a common drive shaft 41 and are also driven on common vertical shafts 38 with the rotating distributors 37.

In addition to the heat removal system tube bundles 32 located in the chamber 29, additional heat removal tube bundles 32 may be disposed in the vapor-condensing and ice-melting chmaber 18 to enhance melting of ice and condensing of vapor (FIGURE 3).

Thus, it will be appreciated that, with the present invention, a new and improved system for separating a solvent in substantially pure form from a solution is provided. In addition in each unit the ice-washing and brine-removal chamber 20 or 20a is disposed in the same housing as are the vacuum freezing chamber 14 or 14a and the common ice-melting and vapor-condensing chamber 18. Moreover, in each of the units, the vacuum freezing chamber, compressor, ice washing and brine-removal chamber and the ice-melting and vapor condensing chamber are arranged so that at least two of the chambers have a common wall which provides simplicity of design, economies in cost and increased strength. Furthermore, the arrangement of these chambers and compressor is such that a plurality of the same chambers and compressors may be utilized with a common ice melting and vapor condensing chamber to increase the potable water producing capacity of the system with a minimum of change in the basic design. In addition, the plurality of the modular units can be employed to permit either independent or staged use of the modular units.

Figure 4:
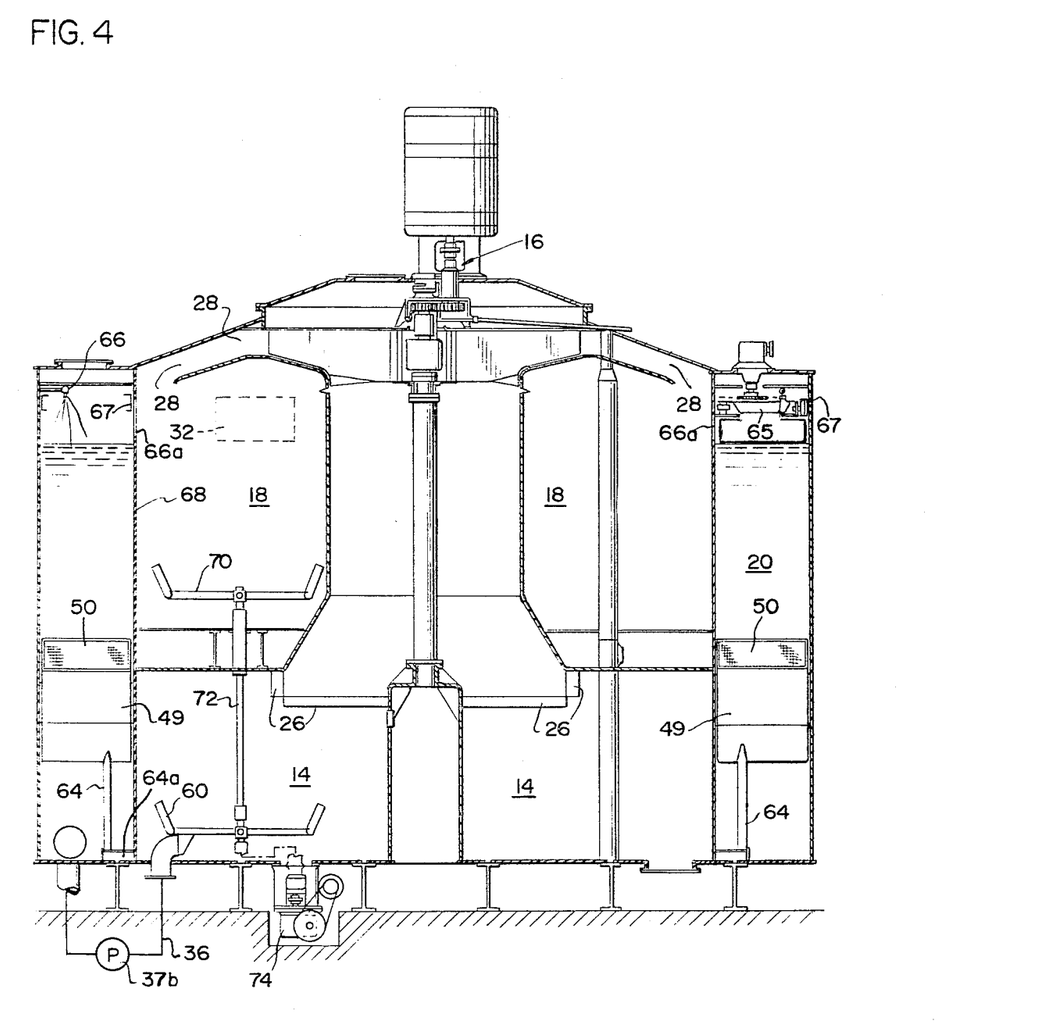
FIGURE 4 is a generally schematic view in vertical section of a second system embodiment of the present invention illustrating an alternative arrangement in a common cylindrical housing of the chamber and compressor components of the system of FIGURE 1.

In FIGURE 4 there is disclosed an alternative arrangement of chambers different from the arrangement of FIGURES 1–3 but with the feature common thereto of a single house 12 for the chambers and compressor and the feature of a wall 68 common to at least two of the chambers, chambers 20 and 18.

In FIGURE 4, the vacuum freezing chamber 14 is disclosed as located at the bottom of the system and employs a rotating ice-sea water pool agitator system 60, such as the type of agitators disclosed in the aforementioned copending application, Ser. No. 433,540. The concentric chambers 14, 18 and 20 are cylindrical in shape and the ice-washing and brine-removal chamber 20 is shown circumscribing the chambers 18 and 14.

The vapor produced in the chamber 14 flows through the carryover separator 26 into the compressor 16 for discharge through the outlet 28 into the ice melting and vapor melting condensing chamber 18. A heat removal system 32 may also be employed in this system. The ice and brine slurry formed in the chamber 14 is removed from the chamber over the line 36 under the influence of pump 37b and is supplied to the bottom of the ice-washing and brine-removal chamber 20.

Brine is removed from the chamber 20 through the brine removal devices 49 by passing through the screens 50 into an outlet 64 for discharge through a conduit 64a. The ice mass formed in the upper portion of chamber 20 is washed by a plurality of peripherally spaced spray nozzles 66, and the washed ice is removed from the top of the ice pack or mass in the chamber 20 and supplied through a circular outlet 66a, to the ice melting and condensing chamber 18. A plurality of vertically spaced support beams (not shown) are located in spaced relation around the periphery of the wall 68 which is common to the ice-washing and brine-removal chamber 20 and the ice melting and vapor condensing chamber 18 to permit passage of the ice through the circular opening 66a into the chamber 18.

A slurry pool of ice and water is formed in the chamber 18 and agitator means 70, similar to the agitator means 60, is employed to enhance distribution of the washed ice slurry in the ice-melting and vapor-condensing chamber 18 and thus enhance melting and condensation of the ice and vapor respectively. It is noted that the agitators 60 and 70 are mounted for rotation on a common vertical shaft 72 which is driven by a motor 74 located outside of the cylindrical wall 12.

The ice melts and vapor condenses in chamber 18 to form potable water which is removed by means (not shown) from this chamber for subsequent use or disposition.

A bladed scraper device 65 which traverses a circular path on a carriage track 67 is utilized to scrape ice from the top surface of the washed ice mass pack in the chamber 20 into the chamber 18.

In operation of the system of FIGURE 4 sea water is introduced into the vacuum freezing chamber 14 through means (not shown) where it flash evaporates to form vapor and an ice slurry. The vapor passes through the carryover separator 26 under the influence of the compressor 16 and is discharged through the compressor outlet 28 into the ice melting and vapor condensing chamber 18. The heat removal tube bundles 32 remove heat from the vapor in order to enhance ice melting and vapor condensation.

The ice and brine slurry is moved over line 36 and is supplied to the chamber 20. Brine is removed from the slurry in the chamber 20 through the brine removal devices 49 and is discharged from the system.

The upwardly moving ice mass formed in the upper portion of the chamber 20 is washed to remove more brine by the spray nozzles 66 and washed ice is scraped by the rotating scraper 65 through the outlet 66a into the ice melting condensing chamber 18. The agitator 70 enhances contact of the ice with the vapor and thereby enhances melting of ice and condensation of vapor. The product water produced in the chamber 18 is removed by means not shown for storage or other disposition.

Thus with this system arrangement the flash freezing evaporating chamber 14, the condensing chamber 18, the compressor 16 and ice-washing and brine-removal chamber 20 are located in a single vessel and the ice-washing and brine-removal chamber 20 has a wall common with the vapor-condensing and ice-melting chamber 18.

Figure 5:
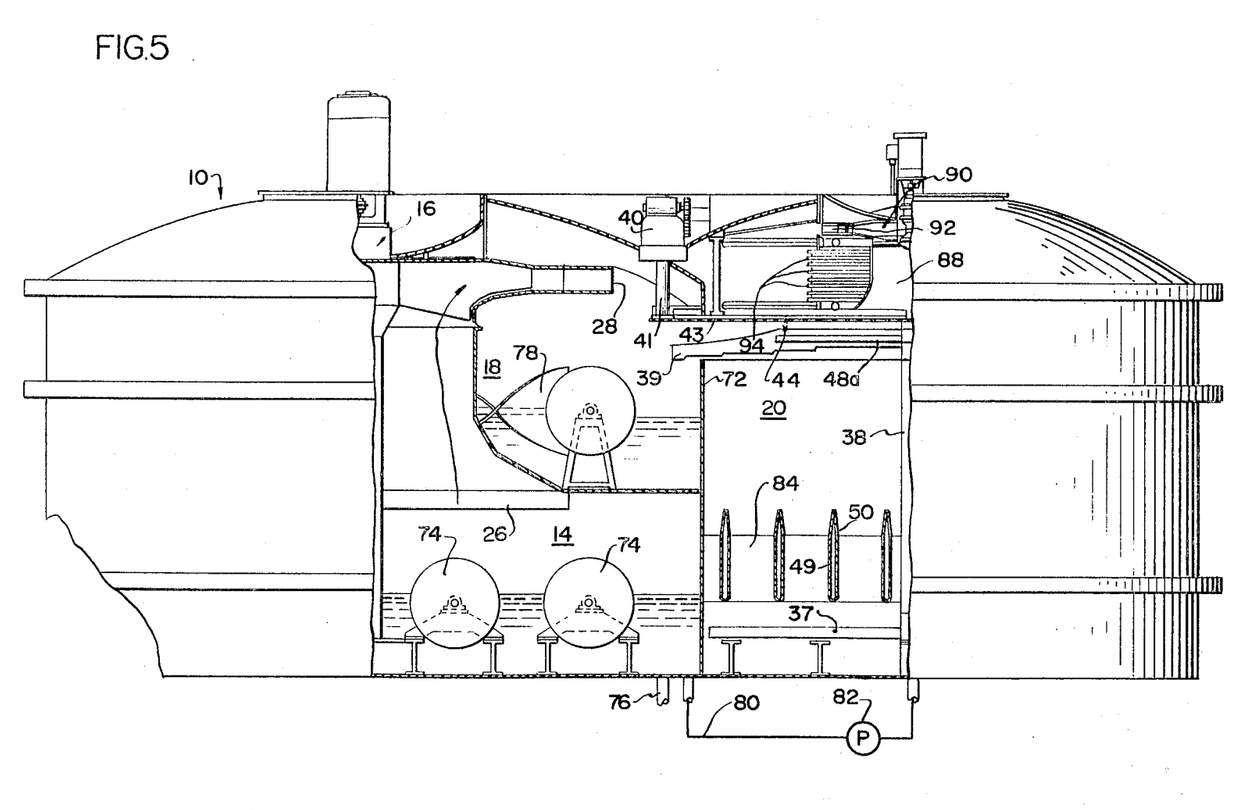
FIGURE 5 is a front plan view, partially broken away to facilitate illustration, of another alternative system embodiment of the present invention showing the chamber and compressor components of the system of FIGURE 1 utilized in a different arrangement from the arrangement shown in FIGURE 1.

In FIGURE 5 is disclosed generally a system and apparatus useful in desalting sea water and which also includes the major components of the systems and apparatus of FIGURES 1 through 4.

In this embodiment of the present invention, the vacuum freezing chamber 14 is shown cylindrical in form and located below the vapor-condensing and ice-melting chamber 18. In this embodiment, the ice-washing and brine-removal chamber 20 is a semi-cylindrical chamber and has a wall 72 common to both the freezing chamber 14 and cylindrical condensing chamber 18.

Spaced auger type agitators 74 are located adjacent the surface of the pool of ice and salt water slurry in chamber 14 for agitating the surface and enhancing the exposure of the sea water to the vacuum conditions in the chamber 14. Sea water may be introduced into the chamber 14 through an inlet 76. The sea water flash evaporates in chamber 14 and forms an ice slurry and vapor. The vapor passes through the carryover separator 26, as indicated by the arrow, and under the influence of the compressor 16 is discharged from the outlet 28 of the compressor into the ice melting and condensing chamber 18. The ice melting and vapor condensing chamber 18 has also located therein an auger type agitator 78 which is of similar construction to the agitators 74.

The ice and brine slurry is removed from the chamber 14 over a line 80 under the influence of a pump 82 and supplied to the rotatable distributor 37 located in the bottom of the ice-washing and brine-removal chamber 20. From the ice slurry is formed a porous ice mass which continuously moves upwardly in chamber 20.

Brine is removed from the forming ice mass through the brine removal devices 49 by passage of the brine through the screens 50 carried by these devices 49 for discharge through a common manifold 84 for subsequent disposition or use.

The ice mass is washed by potable water delivered by conduits 48a carried by the blades of the rotating scraper 39 which, as appears in FIGURE 5, extend radially from shaft 38 with their leading or outer edges overhanging the chamber 18 so that ice is scraped from the top of the washed ice mass into the chamber 18 for subsequent melting thereof by contact with vapor.

The scraper arrangement 39 is driven by a motor 40 having a drive shaft 41 through an endless chain 43 which is connected to the sprocket 44. The rotatable scraper 39 is connected by the vertical shaft 38 to the ice slurry distributor 37 for rotation thereof. This drive and scraper and distributor arrangement is operable similar to the arrangement of the drive mechanism of the embodiment of FIGURE 1.

Heat removal in the embodiment of FIGURE 5, is provided by a compressor and heat exchange tube arrangement located at the top of the ice washing and brine removal chamber 20. Vapor from the chamber 18 flows into the throat 88 of a radial compressor 90 which may be similar to compressor 16 but of smaller size and which discharges the compressed vapor from its outlet 92 into contact with a plurality of heat exchange tubes 94 which condense the vapor and permit the condensed vapor to drop onto the ice pack or mass in the chamber 20 to thereby provide additional wash water for the pack or mass. The ice is scraped, as aforesaid, into the chamber 18 from the chamber 20 and the vapor in chamber 18 contacts the ice for condensation of the vapor and melting of the ice.

The product water produced from the vapor and ice in chamber 18 is then removed from the chamber 18 by means not shown and is supplied for subsequent use or disposition.

It will be appreciated that a plurality of units including a vacuum freezing chamber 14, vapor condensing and ice melting chamber 18, and compressor 16 may be "clustered" about a common ice-washing and brine-removal chamber 20 in the arrangement shown in FIGURE 5 to increase the capacity of the system 10.

Figure 6:
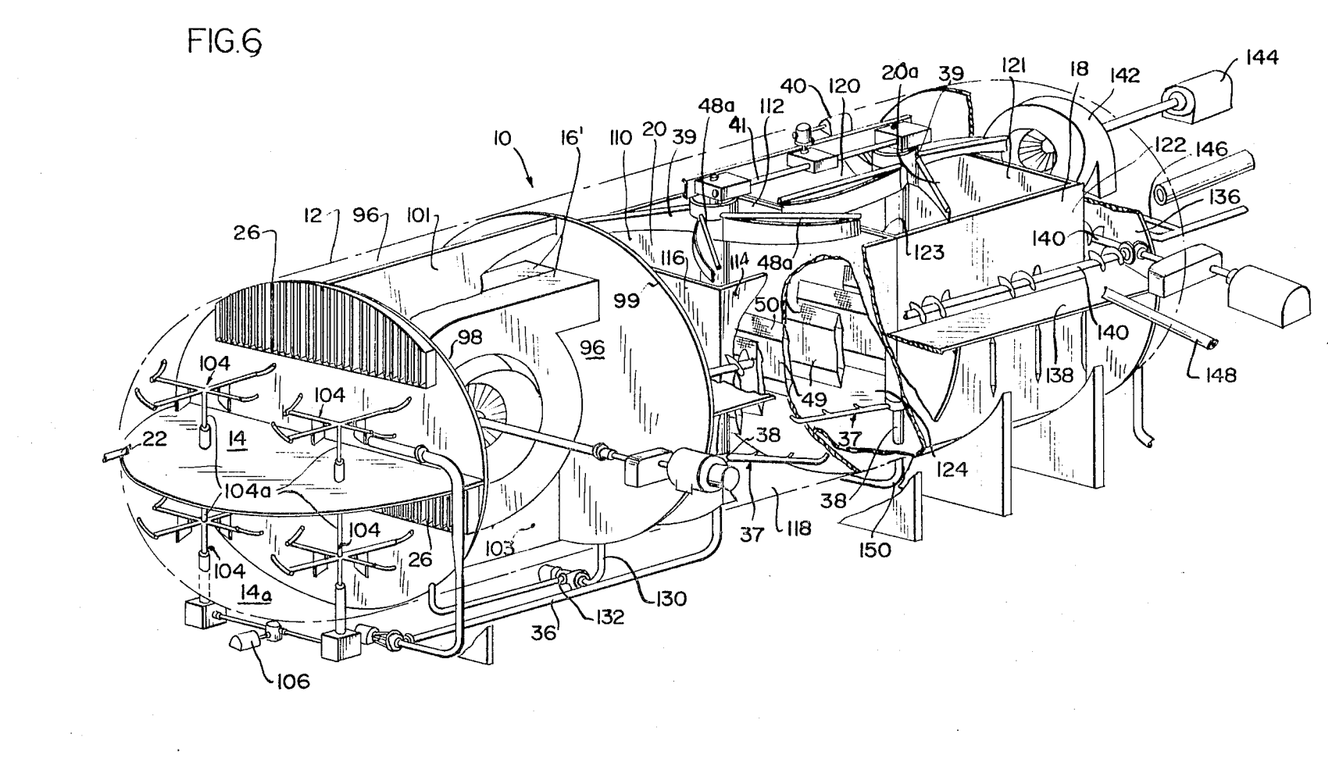
FIGURE 6 is a generally schematic perspective view of another system embodiment of the present invention utilizing a volute type compressor and is shown partially broken away to facilitate illustration.
Figure 7A:
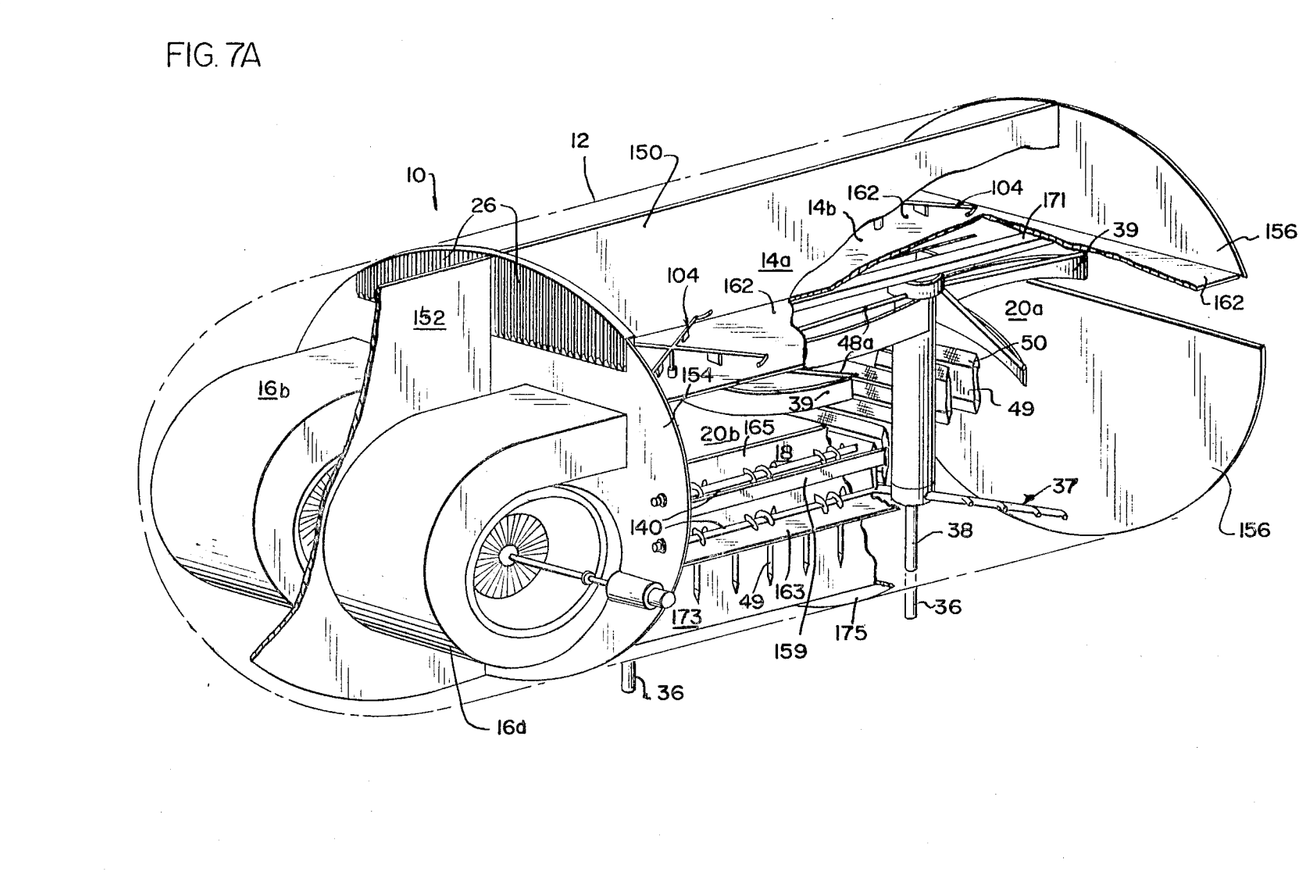
FIGURES 7A and 7B are generally schematic composite views in perspective of still another system embodiment of the present invention employing a volute compressor.
Figure 7B:
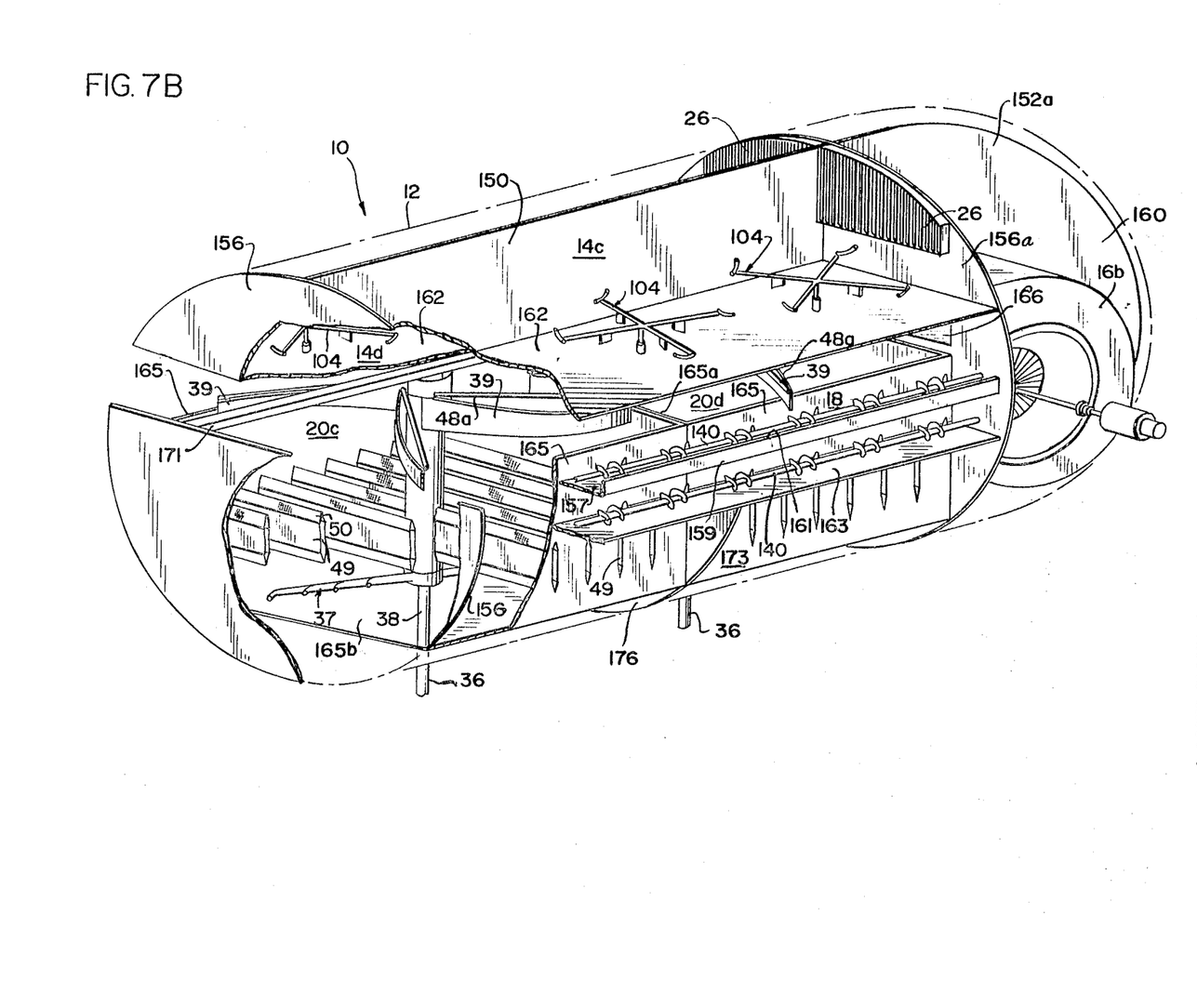

In the systems of FIGURES 6 and 7 a volute type compressor is employed, rather than the radial compressor 16 construction of the systems of FIGURES 1 through 5.

With use of a volute compressor, the height of the system 10 may be conveniently limited and the length of the system increased for uses where area is not a premium or limiting factor.

Referring to FIGURE 6, there is disclosed a system employing a pair of vacuum freezing chambers 14 and 14a, one above the other, a pair of compressors 16' of the conventional volute type, a pair of ice washing and brine removal chambers 20 and 20a and an ice melting vapor condensing chamber 18 described in more detail hereinafter.

Each of the freezing chambers 14 and 14a is provided with a carryover separator 26 through which vapor produced in the chambers 14 and 14a flows into a pair of compressor chambers 96 formed with wall 12 by a plurality of walls 98, 99, 101 and 103. The vertical walls 101 and 103 vertically divide the compressor chambers 96 so that vapor flowing through the carryover separators 26 from the two freezing chambers 14 and 14a is distributed efficiently between these compressor chambers 96 and thus between the compressors 16'.

In the vacuum freezing chambers 14 and 14a are located a plurality of rotating flinger devices 104, such as disclosed in copending application, Serial No. 433,540. These flinger devices 104 cause turbulence in the pool of ice and sea water slurry in chambers 14 and 14a. As indicated in FIGURE 6, a pair of flinger devices 104 is located in each of the chambers 14 and 14a and a flinger device 104 in each chamber 14 and 14a may be mounted on a common rotatable shaft 104a. The pair of shafts 104a mounting the four devices 104 are driven by a common motor and drive arrangement 106.

In operation, sea water is introduced into the upper freezing chamber 14 by inlet 22 and the ice and sea water slurry formed therein is discharged from the chamber 14 over line 36 into the distributor 37 located in the chamber 20. The distributor 37 is similar in construction and operation to the distributor 37 of the embodiment of FIGURE 1 and is mounted for rotation on a common shaft 38 which also carries the rotatable scraper arrangement 39 and wash water distributor pipes 48a.

The rectangularly shaped ice-washing and brine-removal chamber 20 is defined by four vertical walls, walls 110, 112, 114 and 116, and a bottom wall 118.

In the system of FIGURE 6 the rectangularly shaped and open top ice-washing and brine-removal chamber 20a is vertically aligned with the corresponding ice washing and brine-removal chamber 20 and includes vertical side walls 120, 121, 122 and a wall 123 common with wall 112, and a bottom wall 124.

An ice scraper arrangement 39 and an ice and sea water slurry distributor 37 are also vertically mounted for rotation in chamber 20a on a common shaft 38. The motor 40 drives a main drive shaft 41 which is connected by gearing (not shown) to both of the shafts 38 of the distributors 37 and the ice scrapers 39 in chambers 20 and 20a.

Sea brine is removed from chamber 20 through screen devices 49 positioned in this chamber and flows through a manifold (not shown) into an outlet line 130 located at the bottom of the system 10 which, under the influence of a pump 132, moves the concentrated sea water or brine into the lower freezing chamber 14a for treatment of the concentrated sea water or brine in the lower desalination unit.

The ice mass in chamber 20 is washed by the washers 48a which are shown carried for rotation by the scraper 39. The continuously upwardly moving mass of ice formed in the chamber 20 has its washed top surface scraped by the scraper 39 into a rectangularly shaped and open top vapor condensing and ice melting chamber 18 which is defined by the vertical side walls of the ice washing and brine removal chambers 20 and 20a, the end walls 99 and 136 and by a bottom wall 138 which circumscribes the chambers 20 and 20a.

Located in the ice-melting and vapor-condensing chamber 18 are a plurality of horizontally disposed agitator devices 140, similar to the agitating device 78 of the system of FIGURE 5, which agitate the liquid slurry of ice and water in the chamber 18 to thereby enhance contact of vapor with ice for ice melting and vapor condensation in the chamber 18.

A portion of the vapor introduced into the chamber 18 from the compressors 16' flows into a heat removal system which, in this system, is shown as comprising a volute compressor 142 which is smaller in size than the compressor 16' and which is driven by a motor 144. The compressor 142 compresses this vapor, and the compressed vapor is then condensed on a heat exchange surface, such as a bundle of heat exchange tubes 146. The condensate is collected from tubes 146 and then discharged from the surface of the tubes for use or other disposition.

From the chamber 18, the liquid potable water is removed, for example, over a line 148 and supplied to a collection tank not shown.

In the preceding description of the system of FIGURE 6, a staged desalination treatment arrangement is shown and, as aforesaid, ice-brine slurry is pumped from ice washing and brine removal chamber 18 over line 130 into the lower freezing chamber 14a. It will be appreciated that sea water is also introducible into chamber 14a from its source for addition to the brine in the chamber 14a.

The vapor produced in chamber 14a is supplied through the carryover separator device 26 into the two compressor compartments 96, and from the compressors the compressed vapor is supplied into the common condensing chamber 18. The two compressors 16', it is noted, are in open communication with not only both chambers 20 and 20a but also chamber 18. Thus, a common vapor condensing and ice-melting chamber 18 is utilized for both compressors 16' and for both ice-washing and brine-removal chambers 20 and 20a.

The brine or concentrated sea water slurry is removed from the lower evaporating chamber 14a and is supplied by pipe means (not shown) under the influence of pump means (not shown) to the inlet 150 of the distributor device 38 located in chamber 20a. Brine in the ice brine slurry supplied to the chamber 20a is removed through the brine removal devices 49 in chamber 20a. The continuously upwardly moving ice mass is washed by washers 48a and the washed ice mass has its upper surface scraped by the scraper 39 into the common vapor condensing and ice-melting chamber 18 from which potable water produced therein is removed over line 148.

With this system of FIGURE 6, it will be observed that a simple and efficient desalting system results utilizing a volute type compressor and the same chambers utilized in the radial compressor systems of FIGURES 1 through 5, e.g., the freezer chambers 14, 14a, ice washing and brine removal chambers 20 and 20a and a common ice melting and vapor condensing chamber 18. All of these chambers and the compressor are housed in the common housing 12 in the system of FIGURE 6 and at least two of these chambers have a common wall construction, i.e., the chamber 20 and 20a both have a wall common with the ice melting and vapor condensing chamber 18.

In FIGURE 7 which is set forth in two sections as FIGURES 7a and 7b, a system 10 having the capability of producing five million gallons per day of potable water is disclosed.

11

This system of FIGURE 7, as shown includes four stages. Each stage comprises an independent desalination unit including a freezing chamber, freezing chambers 14a, 14b, 14c and 14d, a volute compressor, compressors 16a, 16b, 16c, and 16d, an open top ice-washing and brine-removal chamber, chambers 20a, 20b, 20c and 20d, and an open top, rectangularily shaped ice-melting and vapor-condensing chamber 18 which corresponds to the chamber 18 in the system of FIGURE 6 and is common to the ice washing and brine removal chambers 20a–20d.

In the system of FIGURE 7 the freezing chambers of each of the units, chambers 14a–14d, are located above the ice washing and brine-removal chambers 20a–20d and above the vapor-condensing and ice-melting chamber 18.

As in the system of FIGURE 6, a pair of volume compressors 16a and 16b are employed at one end of the housing 12 for a pair of the freezing chambers, chambers 14a and 14b. A similar pair of volute compressors are located at the other end of the single housing 12, one of which compressors, compressor 16d, is shown in the drawing, are utilized for removing vapor from the freezing chambers 14c and 14d, as more fully described hereinafter.

Each of the four independent desalination units are substantially identical in construction and operation and, therefore, the description to follow of the construction and operation of the first unit including the chamber 14a, compressor 16a, and ice washing and brine-removal chamber 20a will be applicable to the description of the other three units in this system. The description of the system to follow will be directed to use of the four units in staged operation of the system.

Referring to FIGURE 7a, it will be observed that the freezing chamber 14a is defined by a pair of circular vertical end walls 154 and 156, a bottom wall 162, a vertical side wall 150 and a portion of the cylindrical outer housing wall 12. Located in each of the freezing chambers 14a–14d are a pair of flinger type devices 104 heretofore described in connection with the system of FIGURE 6.

The freezing chamber 14a is supplied sea water by means (not shown) and the sea water flash evaporates in the vacuum freezing chamber 14a to form vapor and an ice and brine slurry. The vapor flows through the carryover separator 26 into the compressor 16a and is discharged from the outlet 28 of the compressor 16a into the common ice melting and condensing chamber 18 to be described in more detail hereinafter.

The ice brine slurry is removed from the chamber 14a by the pipe 36 under the influence of a pump (not shown) which supplies the ice brine slurry to the distributor 37 of the ice-washing and brine-removal chamber 20a. The rotating distributor 37 distributes the ice brine in the chamber 20a. Brine is removed from the slurry through the devices 49 located in chamber 20a and is supplied to a manifold (not shown) for supply through means (not shown) to the freezing chamber 14b of the second stage unit.

The ice mass formed in chamber 20a continuously moves upwardly and is scraped by the rotating scraper 39 into the ice melting and vapor condensing chamber 18. Each of the ice-washing and brine-removal chambers 20a–20d, as indicated in FIGURE 7b, comprises a rectangular chamber defined by vertical side walls 165 and 165a and a bottom wall 165b, as clearly appears in connection with the illustration of chambers 20c and 20d in FIGURE 7b.

Referring to FIGURE 7b it will be observed that the ice-melting and vapor-condensing chamber 18 includes a rectangular tray or trough including a bottom wall 157, the adjacent vertical walls 165 of the chambers 20a–20d, the vertical bulkead end walls 154 and 156a and a vertical wall 159. Wall 159 extends the length of the ice melting and vapor condensing chamber 18 on both sides of the ice washing and brine removal chambers 20a–20d and the bottom wall 157 circumscribes chambers 20a–20d.

12

Located in the tray defined by wall 159, which is spaced inwardly from the wall 12, and on each side of the chambers 20a–20d are a pair of horizontally extending auger agitator devices 140 for agitating the ice slurry to enhance melting of the ice in contact with the vapor in this chamber. When the level of water in the trough or tray defined by the wall 159 exceeds the height of this wall, water and ice flows over the upper edge 161 of this wall and cascades onto a base or bottom wall 163 of the ice-melting and vapor-condensing chamber 18 which circumscribes the chambers 20a–20d.

An auger device 140 for agitation of the ice slurry in the bottom of chamber 18 is also provided to extend horizontally on each side of the chambers 20a–20d.

From chamber 18, the potable water produced therein by condensation of the vapor and melting of the ice is removed by means (not shown) for supply to a collection tank or for other disposition.

Brine slurry supplied to freezing chamber 14b from the brine removal chamber 20a of the first unit (FIGURE 7a) is treated in chamber 14b in the same manner as the sea water introduced into chamber 14a. The vapor flows from chamber 14b through the carryover separator 26 and is moved by the compressor 16b, shown to the left in FIGURE 7a, which is separated from the compressor 16a, shown to the right in FIGURE 7a, by a vertically extending wall 152.

The vapor is then supplied by the compressor 16b into the ice-melting and condensing chamber 20b where it contacts washed ice supplied thereto by the scrapers 39 of the ice-washing and brine-removal chamber 20b.

The ice and brine slurry produced in chamber 14b is supplied to the ice-washing and brine-removal chamber 20b from which brine is removed from the slurry through devices 49 in this chamber. The upwardly moving ice mass is washed free of more brine by washers 48a located in chamber 20b.

Thus both of the desalination units including the chambers 14a and 14d supply vapor into the common ice-melting and vapor-condensing chamber 18 and each of the ice-washing and brine-removal chambers 20a and 20b also supply washed ice to the chamber 18. It will be observed that each of the ice-washing and brine-removal chambers 20a–20d have a wall, wall 165 common with the ice-melting and vapor-condensing chamber 18.

Referring to FIGURE 7b it will be observed that the compressors 16c and 16d supply vapor to the common ice-melting and vapor-condensing chamber 18 from the freezing chambers 14c and 14d, respectively. The vapor is supplied into the chamber 18 from compressors 16c and 16d through outlets 166, one of which is shown in FIGURE 7b. It will also be observed that a vertical wall 152a separates the compressors 16c and 16d.

The drive mechanism for the distributors 37 and the scrapers 39 located in each of the chambers 20a–20d can be a common drive mechanism similar to that shown in FIGURE 6 and may be housed in a common horizontally disposed center support beam 171 which extends between the bulkheads 154 and 156a.

In the system of FIGURE 7, the brine removal devices 49 extend to the walls 165 at each end thereof and empty into a manifold 173 located below the wall 163 of the condensing chamber 18. It will be observed that this manifold 173 can be common to at least the adjacent ice-washing and brine-removal chambers 20a and 20b and to the ice removal chambers 20c and 20d, or, as indicated in FIGURES 7a and 7b, the manifold collection chamber 173 may be separated into compartments by vertical bulkhead walls 175 and 176.

It will also be appreciated that the system of FIGURE 7 may be used either for staged production of potable water or the four units of the system may be utilized independently for production of potable water.

It will also be appreciated that various walls of the various systems disclosed in the drawings may be constructed of metal, concrete, plastic and other suitable materials.

Although minor modifications and alterations of the present invention will become readily apparent to those versed in the art, it should be understood that what is intended to be encompassed within the scope of the patent warranted hereon are all such embodiments as reasonably and properly come within the scope of the contribution to the art hereby made.

We claim:

1. In a vacuum freezing, vapor compression system for separating a solvent in substantially pure form from a solution, a unitary unit comprising a first chamber for receiving said solution, means for freezing a portion of said solvent to produce a slurry of frozen solvent and solute and for producing vapor of said solvent in said chamber, a second vapor-condensing and ice-melting chamber, means for moving said vapor from said first chamber to said second chamber, a third frozen solvent washing and liquid removal chamber, means in one of said second and third chambers for washing said frozen solvent, means in said second chamber for separating said frozen solvent from said slurry, at least said second and third chambers having a common wall and one of said second and third chambers being at least partially within the other chamber, means for supplying said slurry to said third chamber, means for removing separated liquid solvent from said third chamber, means for moving said washed frozen solvent to said second chamber for melting of said washed frozen solvent in said second chamber by heat exchange with said vapor of said solvent and condensing of said vapor to produce final product of said vapor and frozen solvent in said second chamber, and means for removing said final product from said second chamber.

2. The system of claim 1 including means to agitate the slurry in said first chamber.

3. The system of claim 2 wherein said agitator means are rotatable about a horizontal axis.

4. The system of claim 1 wherein said means for moving vapor from said first chamber to said second chamber is vapor compressor means.

5. The system of claim 4 including means disposed between said first chamber and said compressor for separating liquid droplets of solution from said vapor.

6. The system of claim 4 wherein said means to move washed frozen solvent is scraper means in said third chamber for moving washed frozen solvent from said third chamber past said common wall into said second chamber.

7. The system of claim 4 including means for distributing said slurry in said third chamber.

8. The system of claim 6 including means for distributing said slurry in said third chamber.

9. The system of claim 4 wherein said means for separating frozen solvent from said slurry includes a plurality of perforated devices located in said third chamber.

10. The system of claim 5 wherein said means for separating frozen solvent from said slurry includes a plurality of perforated devices located in said third chamber.

11. The system of claim 9 wherein each of said devices comprises a substantially rectangular hollow member extending horizontally in said third chamber and having an upper screen section through which solution in said slurry passes.

12. The system of claim 8 wherein said scraper means includes a vertical drive shaft.

13. The system of claim 12 wherein said distributor means is rotatable and includes an inlet and a plurality of radiating radial arms having fluid outlet orifices therein and wherein said drive shaft is also the drive shaft for said distributor means.

14. The system of claim 1 wherein said second and third chambers are concentric.

15. The system of claim 1 wherein said first chamber is located above said second and third chambers and has a bottom wall which is the upper wall of said second and third chambers.

16. The system of claim 1 wherein the third chamber is located within said second chamber.

17. The system of claim 13 wherein said third chamber is located within said second chamber.

18. The system of claim 14 wherein said third chamber is located within said second chamber.

19. The system of claim 15 wherein said third chamber is located within said second chamber.

20. The system of claim 8 wherein said compressor is a radial compressor having a vertical drive shaft and said shaft and said common shaft of said distribution means and scraper means are axially aligned.

21. The system of claim 4 wherein said means for moving washed ice and said compressor means each includes a vertical shaft, said shafts being axially aligned.

22. The system of claim 1 wherein said means for moving vapor is a volute compressor.

23. The system of claim 1 wherein said first chamber is at least partially within said second chamber and said second chamber is at least partially within said third chamber.

24. The system of claim 1 wherein said system is a desalination system, said solution is sea water, said liquid solvent is potable water, said frozen solvent is ice, and said solute is salt.

25. The system of claim 1 including at least one other of said units and including said chambers and said means, and at least the second and third chambers of said second unit having a common wall.

26. The system of claim 25 wherein the second chamber of each of said units are in open fluid flow communication.

27. The system of claim 26 wherein said means for moving vapor is radial compressor means.

28. The system of claim 26 wherein said means for moving vapor is volute compressor means.

29. The system of claim 26 wherein each of the third chambers of said units includes slurry distributor means having a drive shaft and said means for moving vapor is scraper means having a drive shaft and including a common drive mechanism for rotating said shafts.

30. The system of claim 29 wherein said shafts in each of said units is a common shaft.

31. The system of claim 26 wherein said means for removing separated solute from said first chamber of said first unit supplies said solute to said first chamber of said second unit.

32. The system of claim 1 wherein said system is a vacuum freezing, vapor compression separation system.

33. In a freezing system for separating a solvent in substantially pure form from a solution including a separation chamber for separating frozen solvent from a slurry of frozen solvent and solution, the improvement comprising a distributor device in said separation chamber, said device including a passaged rotatable shaft having a plurality of passaged radiating arms, said arms including inlets for receiving said slurry and outlets for supplying said slurry to said chamber, and means for rotating said shaft.

34. In a freezing system for separating a solvent in substantially pure form from a solution including a separation chamber for separating frozen solvent from a slurry of frozen solvent and solution, the improvement comprising at least one solution separation device in said chamber, said device comprising a plurality of passaged brine drainage members transversely disposed across said chamber and defining a plurality of fluid flow passages spaced across said chamber and spaced from the outside walls of said chamber, each of said members carrying a screen section disposed entirely in said chamber for passage of said solution into said member, and means for removing solution from said device.

References Cited

UNITED STATES PATENTS

| | | | |
|---|---|---|---|
| 3,342,039 | 9/1967 | Bridge et al. | 62—123 |
| 2,080,639 | 5/1937 | Taylor | 62—354 |
| 2,764,488 | 9/1956 | Slattery | 62—123 X |
| 3,240,024 | 3/1966 | Ashley et al. | 62—58 |
| 3,251,193 | 5/1966 | Wiegandt | 62—123 X |
| 3,255,603 | 6/1966 | Johnson et al. | 62—123 |
| 3,269,136 | 8/1966 | Shuji Vmano | 62—123 |

ROBERT A. O'LEARY, *Primary Examiner.*

W. E. WAYNER, *Assistant Examiner.*